(12) United States Patent
Blais et al.

(10) Patent No.: US 9,844,848 B2
(45) Date of Patent: Dec. 19, 2017

(54) METHOD OF MACHINING A PART

(71) Applicant: PRATT & WHITNEY CANADA CORP., Longueuil (CA)

(72) Inventors: Mario Blais, Varennes (CA); Fuat Atabey, Brossard (CA); Jean-Yves Barbeau, St-Mathieu-de-Laprairie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 143 days.

(21) Appl. No.: 14/248,640

(22) Filed: Apr. 9, 2014

(65) Prior Publication Data

US 2015/0290756 A1    Oct. 15, 2015

(51) Int. Cl.
  *B23Q 17/22*      (2006.01)
  *G05B 19/402*     (2006.01)
  *B23B 1/00*       (2006.01)
  *B23Q 17/00*      (2006.01)

(52) U.S. Cl.
  CPC ....... B23Q 17/2291 (2013.01); G05B 19/402 (2013.01); *B23B 1/00* (2013.01); *B23B 2270/12* (2013.01); *B23Q 2017/001* (2013.01)

(58) Field of Classification Search
  CPC .......... B23Q 17/2291; B23Q 2017/001; B23Q 15/22; B23Q 2717/003; B23Q 2717/006; B23Q 17/22; G01B 5/252; G01B 5/25
  See application file for complete search history.

(56) References Cited

U.S. PATENT DOCUMENTS

| | | | | |
|---|---|---|---|---|
| 2,806,294 A | * | 9/1957 | Cargill | G01B 5/252 33/199 R |
| 3,073,033 A | * | 1/1963 | Dega | G01B 5/252 33/543 |
| 4,319,400 A | * | 3/1982 | Chung | G01B 5/25 33/639 |
| 4,543,970 A | * | 10/1985 | Noh | B23P 19/06 134/115 R |
| 4,571,814 A | | 2/1986 | Palfery et al. | |
| 4,748,571 A | | 5/1988 | Shippy | |

(Continued)

FOREIGN PATENT DOCUMENTS

| | | | | |
|---|---|---|---|---|
| DE | 4233908 A1 | * | 5/1994 | ............. B23Q 5/245 |
| FR | 891301 A | * | 3/1944 | ......... B23Q 17/2291 |

(Continued)

OTHER PUBLICATIONS

Merriam Webster's Learners Dictionary; http://www.learnersdictionary.com/definition/center; p. 2 Verb Def 1.*

*Primary Examiner* — Sunil K Singh
*Assistant Examiner* — Donte Brown
(74) *Attorney, Agent, or Firm* — Norton Rose Fulbright Canada LLP

(57) ABSTRACT

The method can include: assembling the part to be machined to a pallet into an assembly; measuring a centering of the part relative to the pallet; adjusting the centering of the part relative to the pallet based on said measuring; repeating the steps of measuring and adjusting until determining that the part is centered based on said measuring; and mounting the centered assembly to an automatic machining device and machining the part of the centered assembly with the automatic machining device.

14 Claims, 1 Drawing Sheet

(56) References Cited

U.S. PATENT DOCUMENTS

| | | | | |
|---|---|---|---|---|
| 4,890,371 A | | 1/1990 | Camloh et al. | |
| 5,309,646 A | * | 5/1994 | Randolph, Jr. | G05B 19/402 33/502 |
| 5,359,784 A | * | 11/1994 | Tomida | G01B 5/252 33/520 |
| 6,151,793 A | * | 11/2000 | Carlen | G01D 5/347 33/412 |
| 6,230,070 B1 | * | 5/2001 | Yodoshi | B23Q 1/267 700/162 |
| 6,273,783 B1 | * | 8/2001 | Kim | B23Q 3/186 451/268 |
| 6,588,120 B2 | * | 7/2003 | Athanasiou | G01B 5/252 33/543 |
| 6,884,204 B2 | * | 4/2005 | Watanabe | B23Q 3/183 409/133 |
| 6,973,738 B2 | * | 12/2005 | Kaneda | G05B 19/042 33/628 |
| 7,912,572 B2 | * | 3/2011 | Du | B23Q 17/22 700/174 |
| 8,209,875 B1 | * | 7/2012 | Harris | G01B 5/25 33/286 |
| 8,601,703 B2 | * | 12/2013 | Makiuchi | B23Q 17/2291 33/520 |
| 2013/0282328 A1 | * | 10/2013 | Sato | G05B 19/401 702/150 |

FOREIGN PATENT DOCUMENTS

| | | | | |
|---|---|---|---|---|
| GB | 1019406 A | * | 2/1966 | G01B 5/245 |
| JP | 08057736 A | * | 3/1996 | |
| JP | 8057736 A | | 5/1996 | |
| JP | 11033801 A | | 2/1999 | |
| JP | WO 2010038576 A1 | * | 4/2010 | B23Q 3/183 |
| NO | WO 2007032681 A1 | * | 3/2007 | B23Q 17/22 |
| WO | WO 2004009440 A2 | * | 1/2004 | B23C 3/002 |

* cited by examiner

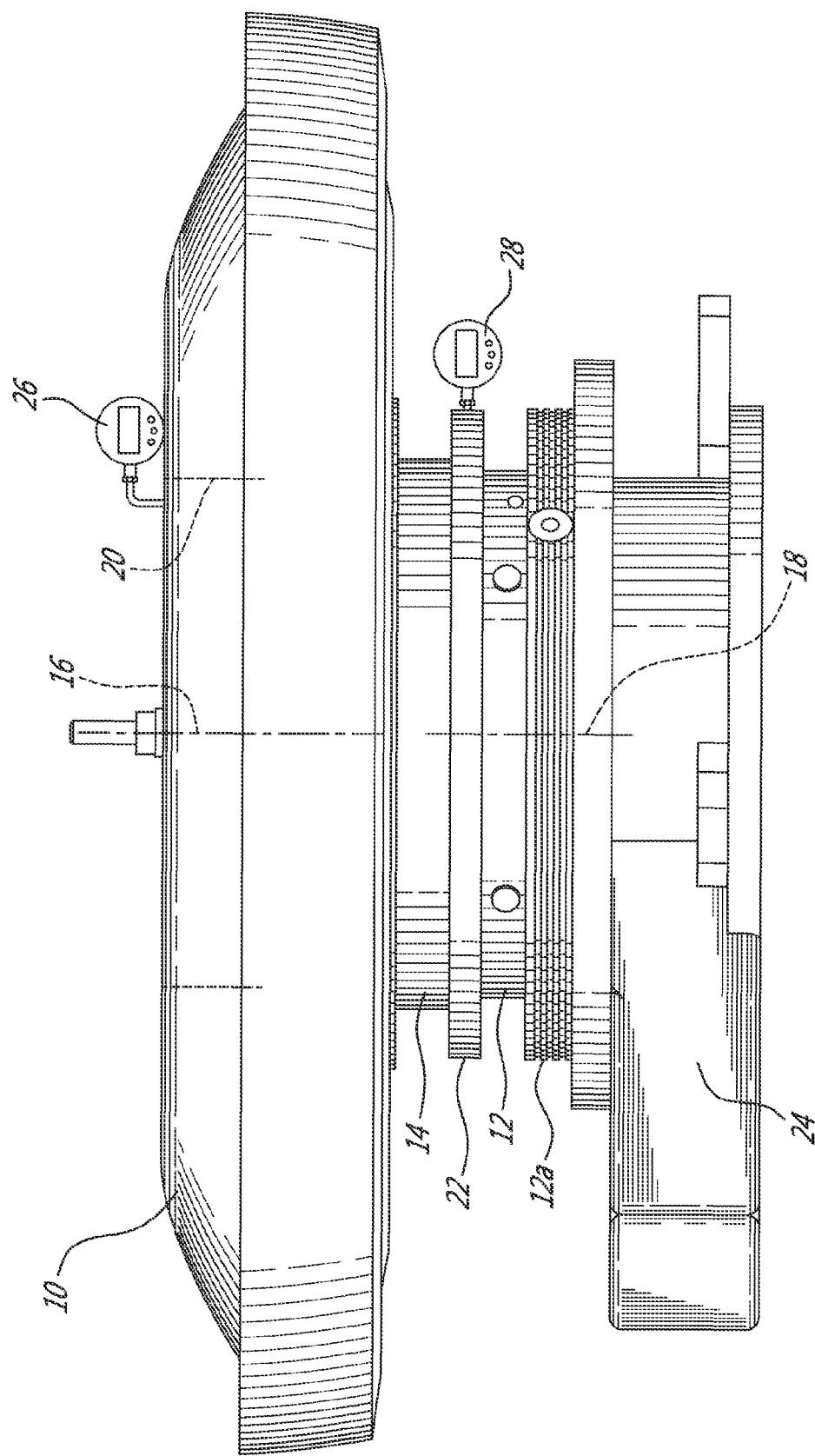

METHOD OF MACHINING A PART

TECHNICAL FIELD

The application relates generally to automatic machine tool (CNC machine) operations and, more particularly, to managing the production of a CNC machine having a lathe.

BACKGROUND OF THE ART

CNC machines often combine multiple tools (e.g. lathe and mill) into a single 'cell', and can be expensive pieces of equipment. There is thus a significant motivation to optimize yield of existing machines in a production plant prior to considering the acquisition of an additional machine. These machines are often operated on three shifts and efforts are made to limit the amount of downtime during each shift.

Apart from normal maintenance operations and repairs, downtime is also present during the step of removing the machined part from the machine and positioning a subsequent part thereon. To address this latter form of downtime, it was known to use specialized equipment referred to as 'pallets' which can be mounted and dismounted to the CNC machine faster than the amount of time it would take to correctly mount and dismount the part itself from the CNC machine. With more than one pallet made available for any given CNC machine, the operator can mount the next part in the production line to a corresponding pallet while a part is being machined by the CNC machine, and the pallets can then be interchanged as soon as the machining is completed.

This latter system reduced downtime and improved machining efficiency. However, in the case of CNC machines having a lathe, the operator still had to center the part on the automatic machine tool. There thus remained room for improvement.

SUMMARY

In one aspect, there is provided a method of machining a part, the method comprising: assembling the part to be machined to a pallet into an assembly; rotating the assembly; measuring a centering of the part relative to the pallet during said rotating; if required based on said measuring, adjusting the centering of the part relative to the pallet; and mounting the centered assembly to an automatic machine tool and machining the mounted part with the automatic machine tool.

In another aspect, there is provided a method of machining a part, the method comprising: assembling the part to be machined to a pallet into an assembly; measuring a centering of the part relative to the pallet; adjusting the centering of the part relative to the pallet based on said measuring; repeating the steps of measuring and adjusting until determining that the part is centered based on said measuring; and mounting the centered assembly to an automatic machining device and machining the part of the centered assembly with the automatic machining device.

DESCRIPTION OF THE DRAWINGS

Reference is now made to the accompanying FIGURES in which:

FIG. 1 is a side elevation view of a part to be machined mounted to a pallet.

DETAILED DESCRIPTION

FIG. 1 shows an embodiment of a part 10 to be lathed with a high degree of precision in a CNC machine cell—a scenario which is common to a relatively high number of parts in the aerospace industry.

The part 10 to be machined is mounted to a pallet 12 which is specifically adapted to be rapidly mountable to the chuck of the lathe of the CNC machine (not shown). The chuck of the lathe of the CNC machine can automatically center the pallet 12 relative to the coordinate system of the CNC machine within a high degree of precision (e.g. within 0.0002"). However, the part 10 needs to be precisely centered relative to the pallet for this high degree of precision to be transferred over to the part.

Typically, pallets 12 have a permanent component 12a which are specific to a given CNC machine cell. However, to allow adaptability of the pallet 12 to different models of parts having different configurations and different sizes, an adapter 14 can be used. The adapter 14 is typically a component which is securely fastened against the permanent component 12a of the pallet on one face and which is specifically adapted to receive a given model of part 10 on the other face. In this embodiment, the adapter 14 can be changed to adapt the pallet 12 to a different model of part.

In this example, the mechanical interfaces between the adapter 14 and the permanent component 12a of the pallet 12, and between the part 10 and the adapter 14, can be sources of misalignment between the axis 16 of the part and the axis 18 of the pallet. Such misalignment can exceed the tight tolerances required.

The part 10 can be mounted to the adapter 14 by clamping in a manner to allow adjustments to be made to correct such misalignment. This can be done by measuring the centering of the part 10 relative to the coordinate system of the CNC machine while the part 10 is mounted to the chuck of the lathe. This can be done using a suitable indicator positioned at fixed coordinates in the coordinate system of the CNC machine and positioned against a locating diameter 20 of the part 10, rotating the chuck, and measuring the deviation of the locating diameter 20 of the part 10 by monitoring the indicator during the rotation. The centering can then be done by partially unclamping the part from the adapter, providing a suitable impact on the part, and fully reclamping the part to the adapter. This process can be repeated until the part is measured to be satisfactorily centered relative to the coordinate system of the CNC machine. However, this process can be relatively time-consuming and corresponds to undesired down time of the CNC machine.

It was found that this latter source of down time can be mitigated by centering the part 10 relative to the pallet 12 separately from the chuck of the CNC machine, while the CNC machine is busy machining another part. Since the pallet 12 can be precisely and rapidly received into the chuck, the part to be machined will automatically be centered in the CNC machine coordinate system if it is precisely centered relative to the center line 18 of the pallet 12.

In this embodiment, the pallet 12 is provided with a locating diameter 22 to this end. The locating diameter 22 can be internal or external, and can be satisfactorily provided by machining with the corresponding CNC machine beforehand, to name an example.

The assembly formed by the pallet 12 and part 10 (optionally including the adapter 14), can be mounted into a chuck and rotated in a set-up station 24 independently from the CNC machine operation. Rather than measuring the centering of the part 10 relative to the CNC machine coordinate system, the centering of the part 10 is measured relative to the pallet 12. This can be achieved by using two dial indicators 26, 28—one 26 applied to the locating diameter 20 of the part 10 and the other 28 applied to the locating diameter 22 of the pallet 12—during said rotation and by monitoring the relative run-out (delta value) therebetween, or in any other suitable manner. The adjustments deemed necessary based on the measurement can then be performed at the set-up station 24 (typically in the form of suitable impacts onto the part while the clamp is half-released), and the process repeated until the relative run-out is measured to be within given tolerances, while the CNC machine is at work on another part. As soon as the other part machining operations are finished, the finished part and its pallet can be removed from the CNC machine and the part 10 and pallet 12 previously readied at the set-up station 24 can be mounted to the chuck in a relatively rapid, and pre-centered, manner.

Depending on the particular application, the degree of automation of the set-up station can vary from mainly manual operation to highly automated centering of the part.

The above description is meant to be exemplary only, and one skilled in the art will recognize that changes may be made to the embodiments described without departing from the scope of the invention disclosed. For example, an interchangeable adapter is integrated with the pallet in the illustrated embodiment. Such an adapter is optional and can be omitted in alternate embodiments. Moreover, alternate ways to obtain an indication of relative centering between the part to be machined and the pallet than dial indicators can be used in alternate embodiments, such as using systems based on artificial vision or the like. Still other modifications which fall within the scope of the present invention will be apparent to those skilled in the art, in light of a review of this disclosure, and such modifications are intended to fall within the appended claims.

The invention claimed is:

1. A method of machining a part, the method comprising:
   assembling the part to be machined to a pallet to form an assembly;
   prior to mounting the assembly to an automatic machine tool,
      rotating the assembly at a set-up station separate from the automatic machine tool,
      while rotating the assembly, measuring at the set-up station a centering of the part relative to a center axis of the pallet by comparing variations of movement of a reference point of the pallet with variations of movement of a reference point of the part, and
      based on said measuring, pre-centering the part in a coordinate system of the automatic machine tool by adjusting at the set-up station the centering of the part relative to the center axis of the pallet; and
   mounting the centered assembly to the automatic machine tool and machining the mounted part with the automatic machine tool.

2. The method of claim 1 wherein the step of assembling the part includes assembling the part to be machined to the pallet via an adapter, into the assembly.

3. The method of claim 2 wherein the step of adjusting the centering of the part relative to the center axis of the pallet includes partially loosening the part relative to the adapter, moving the part relative to the adapter based on the measuring, and securing the part relative to the adapter.

4. The method of claim 1 wherein the steps of rotating, measuring and adjusting are repeated until the part is measured to be centered relative to the center axis of the pallet within given tolerances.

5. The method of claim 1 wherein the pallet has been previously machined using the automatic machine tool to obtain the reference point.

6. The method of claim 1 wherein the set-up station has a rotary chuck receiving the pallet.

7. The method of claim 1 wherein the mounting includes mounting the pallet to a chuck of a lathe of the automatic machine tool.

8. A method of machining a part, the method comprising:
   assembling the part to be machined to a pallet to form an assembly;
   prior to mounting the assembly to an automatic machining device,
      mounting the assembly to a rotary chuck,
      measuring, at a set-up station separate from the automatic machine tool, a centering of the part relative to a center axis of the pallet by rotating the assembly on the rotary chuck and monitoring a relative run-out between the part and the pallet while rotating the assembly,
      pre-centering the part in a coordinate system of the automatic machine tool by adjusting, at the set-up station, the centering of the part relative to the center axis of the pallet based on said measuring, and
      repeating the steps of measuring and adjusting until determining that the part is centered based on said measuring; and
   mounting the centered assembly to the automatic machining device and machining the part of the centered assembly with the automatic machining device.

9. The method of claim 8 wherein the step of assembling the part includes assembling the part to be machined to the pallet via an adapter, into the assembly.

10. The method of claim 9 wherein the step of adjusting the centering of the part relative to the center axis of the pallet includes partially loosening the part relative to the adapter, moving the part relative to the adapter based on the measuring, and securing the part relative to the adapter.

11. The method of claim 8 wherein the measuring is done by comparing the variations of movement of a reference point of the pallet with the variations of movement of a reference point of the part while the assembly is rotating.

12. The method of claim 11 wherein the pallet has been previously machined using the automatic machining device to obtain the reference point.

13. The method of claim 11 wherein the set-up station has the rotary chuck receiving the pallet.

14. The method of claim 8 wherein mounting the centered assembly to an automatic machining device includes mounting the pallet to a chuck of a lathe of the automatic machining device.

* * * * *